United States Patent [19]

Ando et al.

[11] Patent Number: 4,807,296

[45] Date of Patent: Feb. 21, 1989

[54] AUTOMATIC PATTERN ORIGINAL READING APPARATUS

[75] Inventors: Masaaki Ando, Yokohama; Masaaki Matsuzaka, Fujisawa, both of Japan

[73] Assignee: Nippon Seiko Kabushiki Kaisha, Tokyo, Japan

[21] Appl. No.: 743,790

[22] Filed: Jun. 12, 1985

[30] Foreign Application Priority Data

Jun. 12, 1984 [JP] Japan ................. 59-119206

[51] Int. Cl.⁴ ............................................. G06K 9/00
[52] U.S. Cl. ........................................ 382/8; 358/101; 364/474.01; 408/13
[58] Field of Search ............ 382/8, 17; 364/474, 364/475; 235/469, 466; 356/402, 418; 250/557, 561, 226; 358/101, 107; 408/8, 12, 13; 409/96; 29/721

[56] References Cited

U.S. PATENT DOCUMENTS

| | | | |
|---|---|---|---|
| 3,471,684 | 10/1969 | Berezov | 235/469 |
| 3,632,993 | 1/1972 | Acker | 235/469 |
| 4,135,239 | 1/1979 | Hamill, III et al. | 364/475 |
| 4,398,136 | 8/1983 | Tanaka | 408/8 |
| 4,485,453 | 11/1984 | Taylor | 364/475 |
| 4,486,128 | 12/1984 | Baker et al. | 408/13 |
| 4,624,607 | 11/1986 | Kato et al. | 364/474 |

FOREIGN PATENT DOCUMENTS 60-263604 12/1985 Japan ..................... 408/8

*Primary Examiner*—Leo H. Boudreau
*Assistant Examiner*—Joseph Mancuso
*Attorney, Agent, or Firm*—Arnold S. Weintraub

[57] ABSTRACT

An automatic pattern original reading apparatus is disclosed in which perforation position coordinate data of a pattern original indicating a perforation position of a printed substrate is stored beforehand, and a hole diameter indication sheet having a colored indication which discriminates perforation diameter and which is located at a position corresponding to the perforation position of the pattern original is placed on a table. The table and an optical system for optically reading reflected light from the color indication through color filters are moved relatively to each other by position control circuits to the perforation position. The color detection output from the optical system is discriminated with respect to color by a color discrimination circuit, and the color discrimination output is stored in a memory as hole diameter information in a corresponding relationship with the perforation position coordinate data.

4 Claims, 2 Drawing Sheets

AUTOMATIC PATTERN ORIGINAL READING APPARATUS

BACKGROUND OF THE INVENTION

1. Field of the Invention

The present invention relates to an apparatus for automatically reading a pattern original for a printed substrate in which the pattern original for the printed substrate is read optically to prepare an NC tape to be used in perforating the printed substrate.

2. Description of the Prior Art

Generally, a printed substrate for mounting electronic components includes a copper foil pattern formed on a phenol resin laminated board having a paper base, or an epoxy resin board containing glass fibers combined therewith, and a number of holes are formed in the pattern at predetermined positions for inserting the electronic components.

The holes for the electronic components may exceed 1000 even for a small substrate and, in case of a substrate for mounting highly integrated ICs, the holes are formed by drilling typically by the use of a numerically controlled automatic perforator in order to obtain the degree of perforation accuracy required.

This numerically controlled automatic perforator is arranged to perform drilling of a hole by selecting a drill of a predetermined diameter based on perforation information of an NC tape which is prepared by reading a perforation position from a pattern original made by printing a pattern of the printed substrate on a film.

In preparing the NC tape, it is general to read the coordinates of the perforation position from the pattern original. In this respect, the pattern original is formed by printing in black color a pattern of a copper foil portion used for wiring on a transparent and colorless film 50, as shown in FIG. 4 a portion for inserting an electronic component as represented by a circular pad 52, with a transparent portion 54 provided at the center thereof. This transparent portion 54 indicates a position to be perforated by the drill and also indicates a drill diameter.

In order to read the coordinates of the position of the pad on the pattern original, in the prior art, a table manually operable to move in the X and Y directions and capable of outputting coordinate information is used together with a projector disposed above the table to manually input the coordinates of the perforation position.

In other words, a portion of the pattern original positioned and placed on the table is projected with magnification onto a screen of the projector, and the center of the pad on the pattern original is aligned with a cross mark provided on the screen by manipulating the table by a manipulating handle, and X and Y position coordinate data of the table at this time is generated by manipulating a switch, and the data of the X and Y position coordinates is punched or recorded on the NC tape. This method of preparing the NC tape requires the operator to correctly align or register the center of the pad on the pattern original with the cross mark on the screen. This registration operation is cumbersome and, further, since this operation is carried out manually, a problem arises in that an inputting mistakes are possible.

In order to solve the problem of such a manual operation, as disclosed in U.S. Pat. No. 4,348,592 issued to the applicants of the present application, a pattern reading apparatus for automatically reading pads in the pattern original was proposed. In this pattern reading apparatus, a pattern original is placed on an XY table and scanned by an image sensor, such as a one-dimension photo diode array or a two-dimension photo diode array, or by an image pick-up tube, and the coordinates of the center of a hole and the hole dimeter are calculated when a change in an image signal from the image sensor satisfies a condition corresponding to a circular hole. In the case of the circular hole, the image signal changes during the scanning line in such that a white portion appears between black portions, the white portion increases gradually, and the white portion decreases gradually from a certain time point, and a solid black portion appears again.

However, in the prior art pattern reading apparatus, since the perforation diameter is read from the pattern original by the image sensor or image pick-up tube, in order to obtain accurate hoel diameter information, it is required to make the feed pitch of the XY table small, and, at the same time, to make the resolution of the image sensor or image pick-up tube higher and to increase the scanning density. Consequently, a problem arises in that the reading and processing time becomes longer. Further, in the pattern original, a diameter of a transparent portion 54 (in FIG. 4) within the pad is required to correspond to an actual drill diameter, and hence where there are many different hole diameters, a problem arises in that the preparation of the pattern original becomes cumbersome.

In order to solve the problems mentioned above, an automatic pattern original reading apparatus has been proposed in which the transparent portion in the center portion of the pad is provided with a colored indication corresponding to a hole diameter, and the hole diameter is read by detecting the color. However, in this reading apparatus, since the coloring is provided in the transparent portion of the center portion of the pad in the pattern original, and further, since the diameter of the transparent portion is usually about 0.8 mm, and a smaller diameter is as small as 0.5 mm, the color for these diameters is difficult to detect. In addition, since this apparatus is usually designed to read the coordinates of the perforation position and the hole diameter simultaneously, in order to determine the coordinates of the perforation postiion, a change in the image signal in the course of scanning, that is, a colored light portion appears between black portions of the pad, the width of the colored light portion decreases gradually on the way to ultimately resulting in a solid black portion, must satisfy the condition for a circular hole, and when this condition is satisfied it is determined that a pattern which has been read is a hole. However, at the instant when the hole to be read is determined, since the scanning position has already passed through the hole, the colored indication located at the read perforation position cannot be read anymore. Therefore, when the colored light portion appears in the black portion, the colored indication at this position must be read and stored beforehand. Further, since the stored information must be retained until it is determined whether the stored information corresponds to the hole to be read or not, a problem is involved in that the capacity of a memory device must be large and consequently data processing time becomes long resulting in much longer reading and processing time.

Furthermore, since components have recently been mounted on the printed substrate with higher density such as two pieces of wiring foil are penetrated in an interval (2.54 mm) between adjacent legs of an IC, sometimes a plurality of holes to be read happen to exist within a small breadth (e.g., 5 mm) of scanning, and hence the color detection cannot be achieved in the detection of point information if the pitch is too rough.

To avoid this drawback, it is considered to color the entire hole portion to be perforated and to distinguish it from a transparent and coloress portion in which no wiring is provided. However, if it is done in this manner, another drawback will be caused in that one of color information for discriminating drill diameters one from another will be decreased, and also a majority of holes will have to be colored one by one without leaving these holes to be transparent irrespective of the fact that actually about 80% of holes to be perforated in a printed substrate are of the same diameter.

Furthermore, in reading apparatus of the type in which the coloring in the pattern original is detected by optically scanning the surface of the pattern original, a problem exists wherein a considerable number of detecting elements corresponding to the width of the scanning must be used, and thus a capability of discriminating colors cannot be enhanced due to non-uniformity of output characteristics of individual detecting elements.

SUMMARY OF THE INVENTION

In view of the foregoing, a first object of the present invention is to provide an automatic pattern original reading apparatus arranged to use a hole diameter indication sheet having a portion colored in accordance with a hole diameter and located at a position corresponding to a perforation position in a pattern original, and the hole diameter is read by an optical system to thereby enable accurate hole diameter data in correspondence with the coordinates of the perforation position to be read in a short time.

A second object of the present invention is to provide an automatic pattern original reading apparatus which is capable of discriminating many kinds of hole diameters by use of a plurality of different hole diameter indication sheets.

A third object of the present invention is to provide an automatic pattern original reading apparatus which is capable or reducing reading and processing time by skipping the coordinates of a perforation position after the determination of a hole diameter by a prior reading porcess has occurred in the case where a plurality of different hole diameter sheets are used.

DESCRIPTION OF THE PREFERRED EMBODIMENT

Figure 1:
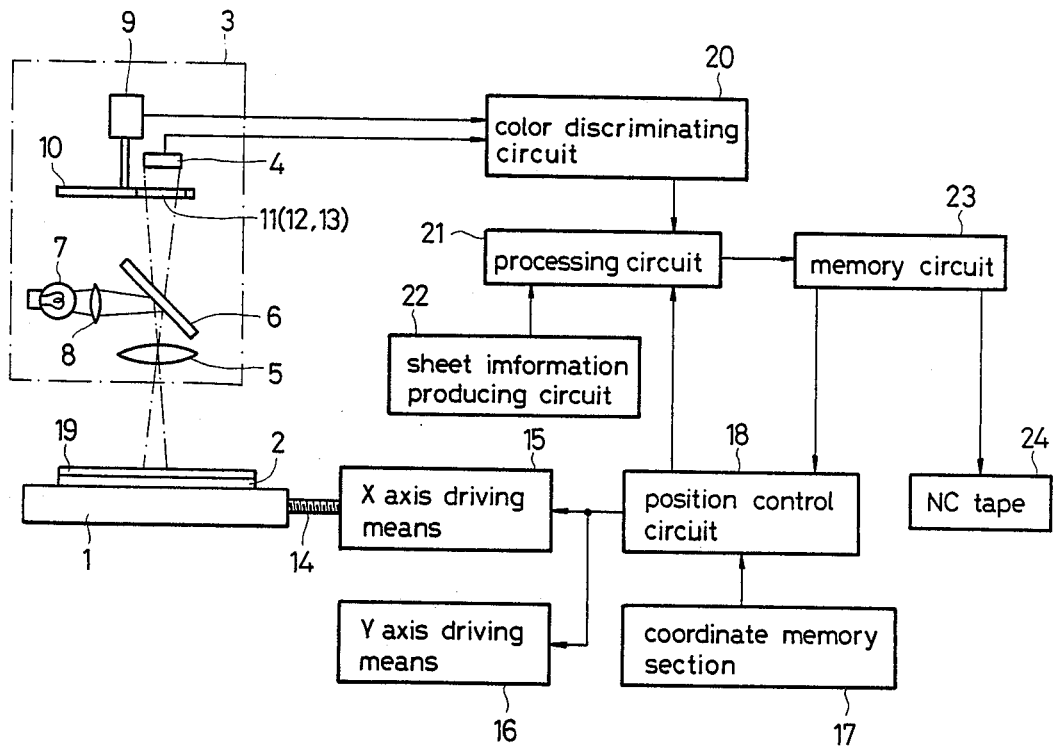
FIG. 1 is a block diagram showing an embodiment of an automatic pattern original reading apparatus according to the present invention.

Referring to FIG. 1, on the upper surface of an XY table 1, there is positioned and placed a pattern original 2 for a printed substrate; an optical system 3 is provided above the XY table 1.

The optical system 3 includes in the upper portion thereof a photo detector 4 for optically reading the pattern original 2 and a lens 5 in a lower portion for focusing an image of the pattern original 2 onto the photo detector 4.

Further, a half-mirror 6 tilted 45° with respect to the axial line of the photo detector 4 is provided between the lens 5 and the photo detector 4. Opposed to the half-mirror 6 and in the horizontal direction perpendicular to the axial line of the photo detector 4, there is disposed a light source 7. Light from the light source 7 passes through a condenser lens 8, is reflected from the half-mirror 6 downwardly and is focused by the lens 5 onto a hole diameter indication sheet 19, placed on the pattern original 2, to illuminate the hole diameter indication sheet 19.

Figure 3:
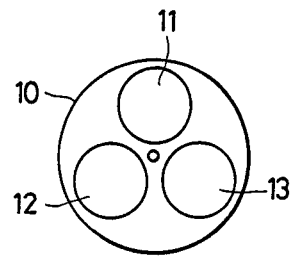
FIG. 3 is a front view of a filter disk applicable to the present invention.
Figure 4:
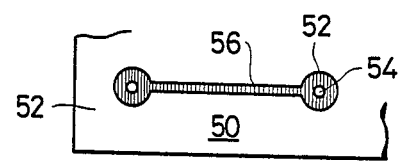
FIG. 4 is a schematic view showing an example of a pattern for a printed substrate.

Between the half-mirror 6 and the photo detector 4, a disk 10 rotated by a motor 9 is disposed to interrupt a path of light incident on the photo detector 4. On the disk 10, three circular color filters 11, 12 and 13, as shown in FIG. 3 are disposed respectively at positions equally dividing the circumference. The filters 11, 12 and 13 constitute respectively a red filter 11, a green filter 12 and a blue filter 13 of the three primary colors of light. When the disk 10 rotates, the optical system 3 generates a filter selecting signal representing a filter position of the disk 10 below the photo detector 4, and at the same time, the light incident of the photo detector 4 is detected in a condition in which the light is resolved, by selectively being transmitted through the color filters 11, 12 and 13 into three colors including light having intensity determined by passing through the red filter 11, light having intensity determined by passing through the green filter 12, and light having intensity determined by passing through the blue filter 13.

The XY table 1 is movable in the X axis direction by an X axis driving means 15 which drives a feed screw 14. The numeral 16 indicates a Y axis driving means which drives the XY table 1 in the Y axis direction, and a driving device for the purpose, such as a feed screw, is not shown in the drawing.

Further, although it is not shown in FIG. 1, the reading apparatus is provided with another optical system similar to the optical system 3 for reading a hole position of the pattern original 2. This optical system for reading the hole position employs as a photo detector an image sensor having many minute photo detector elements arranged linearly.

By such an optical system for reading the hole position, the coordinates of a perforation position of the pattern original 2 is read beforehand and stored in a coordinate memory section 17 as perforation position coordinate data. The position coordinate data retained in the coordinate memory section 17 is sequentially read out to a position control circuit 18, and the position control circuit 18 processes the read-out data and supplies the X axis driving means 15 and Y axis driving means 16 with control signals for sequentially moving the XY table 1 and the optical system 3 relatively to each other to the coordinates of the perforation position of the pattern original 2.

On the pattern original 2, there is placed a hole diameter indication sheet 19 having a colored indication at a position corresponding to a perforation position portion on the pattern original 2, which colored indication indicates a drill diameter to be used in perforation. This hole diameter indication sheet 19 is a transparent and colorless sheet, and the transparent and colorless nature also designates one piece of color information. The information designated by the transparent and colorless nature of the sheet 19 represents the drill diameter which is to perforate the greatest number of holes among the various required drills. The coloring or color coating work is efficient since the color coating is only necessary for the rest of the holes. On this hole diameter indication sheet 19, the color coating is provided beforehand only for hole positions requiring the colored indication by superposing the hole diameter sheet 19 on the pattern original 2.

The hole diameter sheet 19 placed on the pattern original 2 on the XY table 1 is read by the optical system 3. In this case the pattern original 2 may be removed, however, with the pattern original 2 fixed on the table 1, and by positioning the hole diameter indication sheet 19 by means of a registration mark provided on the sheet 19 with respect to the pattern original 2, the possibility of a positioning error of the hole diameter indication sheet 19 can be reduced.

A signal from the photo detector 4 of the optical system 3, produced by reading the hole diameter sheet 19, is introduced to a color discriminating circuit 20 to discriminate colors. At this time, the filter selecting signal of the optical system 3 is also applied to the color discriminating circuit 20 and simultaneously the signal of the photo detector 4 is taken into the color discriminating circuit 20 in synchronism with changing the position of the color filters 11, 12 and 13 with respect to the photo detector 4.

The color detection is performed with respect to a circular area having a diameter of about 1.3 mm on the hole diameter indication sheet 19. This diameter corresponds to a minimum diameter of the pad 52 of the pattern original 2. The reason why the area used for detection or measurement can be made as large as mentioned above is that the reflected light from the detection surface is detected or measured as to a wavelength of a certain color determined by each of the color filters 11, 12 and 13, and even when a colored portion is transparent, the amount of reflected light is large, and thus, a block portion of the pattern original 2 underlying the hole diameter sheet 19 hardly affects the color detection even when any of the red, green and blue filters 11, 12 and 13 is used in the detection.

The color discriminating circuit 20 is capable of discriminating one from another with respect to eight colors, namely three primary colors of light, three intermediate colors of the primary colors, and black and white, on the basis of the signals from the photo detector 4 corresponding to the light intensity after having passed through each of the color filters 11, 12 and 13. Among these colors, since black is used in a wiring portion of the pattern original 2, seven (7) colors excepting black are used to classify the types of drills used for perforation. Since the pattern original 2 is transparent and colorless, white color is detected by reflected light from the upper surface of the XY table using the upper surface as a mirror surface. In the color discrimination, eight kinds of colors are employed as mentioned above, because paint, felt pens and the like used for coloring the hole diameter indication sheet 19, generally have twelve (12) colors or so, and even in the same color paint, non-uniformity exists in the products. Also depending on the manner of color coating, the output of the photo detector 4 is not uniform. The eight (8) colors are selected form a practical view point as mentioned above. Theoretically, several tens or several hundreds of kinds of colors may be used. However, when increasing the number of colors, the colors to be coated must be consistent, and the color discriminating circuit 20 becomes complicated, and furthermore, the work of color coating of the hole diameter indication sheet 19 with a great number of colors will be more difficult.

The color discrimination output resulting from color discrimination in the color discriminating circuit 20 is input to a processing circuit 21. The position coordinate data of a position under detection or measurement is also input from the position control circuit 18 to the processing circuit 21 along with sheet information which identifies the hole diameter indication sheet 19 placed on the pattern original 2 from the sheet information producing circuit 22. This sheet information is needed since a plurality of hole diameter indication sheets must be used when the kinds of perforations are equal to or more than seven. The sheet information identifying the hole diameter indication sheet 19 is obtained by reading a designated colored indication located at a predetermined position on the hole diameter indication sheet 19. However, this sheet information may be obtained by identifying a mark instead of a color, and alternatively, the sheet information may be input by other means, for example, by a switch manipulation by the operator when the hole diameter indication sheet 19 is set.

In the processing circuit 21, the position coordinate data, the sheet information, and the hole diameter information, which is the color discrimination output, are output in corresponding relationships with one another and stored in a memory 23. When the storing of the memory 23 is completed, a storage completion signal is output to the position control circuit 18, and the position control circuit 18 outputs the control signals respectively to the X axis driving means 15 and the Y axis driving means 16 to move the XY table 1 and the optical system 3 to the coordinates to be measured next to thereby proceed with the reading of the next perforation position. When the position control circuit 18 applies the control signals to the X axis driving means 15 and the Y axis driving means 16, if the hole diameter indication sheet 19 is a second sheet or any other following the second sheet, read completion data for the data stored in the memory circuit 23, that is, for the perforation position coordinates has been output to the position control circuit 18. The position control circuit 18 skips so that any positioning may not be carried out again for the position coordinates for which the reading has already been finshed, and thus the reading can be performed efficiently.

Data read into the memory circuit 23 is read out and stored on an NC tape 24 in response to an output instruction from the processing circuit.

In this embodiment, in addition to the colors for discriminating the drill diameters used for perforation, the sheet information for identifying the hole diameter indication sheet 19 is required. As a result, for example, if two sheets are assorted with each other, forty-nine (49) kinds of different hole diameters can be discriminated, and if three sheets are assorted therewith, three hundred and forty-three (343) kinds of different hole diameters can be discriminated. However, where the number of hole diameters is not so large, one color of the seven colors may be used as an indication for reading, and this color may be used in place of the sheet information. In this manner, the kinds of hole diameters discriminatable by three hole diameter indication sheets is nineteen (19).

Figure 2:
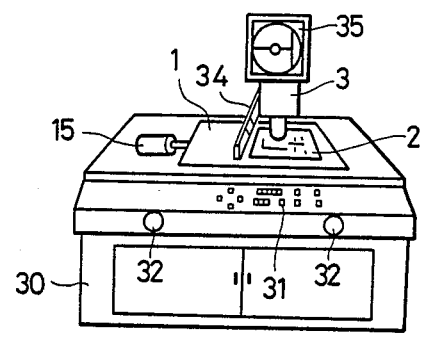
FIG. 2 is a perspective front view of the automatic pattern original reading apparatus of the present invention.

The external appearance of the automatic pattern original reading apparatus of the present invention is shown in FIG. 2. The apparatus includes a main body, a manipulation button 31, and handles 32 and 34 for manually adjusting the relative position between the XY table 1 and the optical system 3 in the X and Y directions. Further, reference numeral 34 designates a scale for detecting the position coordinates of the optical system 3. Reference numeral 35 designates a screen on which the pattern original 2 is projected and magnified. The screen 35 is also used for registration of the pattern original 2. In the automatic pattern original reading apparatus of the present invention, the hole diameter indication sheet 19 is illuminated by the light source 7 above the table, the optical system 3 and the table 1 are relatively and sequentially positioned in accordance with the perforation position coordinate data which is read beforehand, the color detection signal is obtained by the incident light on the photo detector 4, which light is selectively transmitted through the color filters 11, 12 and 13 to obtain the color detection signal, and the color detection signal is discriminated with respect to color by the color discriminating circuit with the result being stored in the memory circuit as hole diameter information in a corresponding relationship with the perforation position data. Accordingly, the reading of the color can be made with respect to a positioned point and with respect to a surface having a certain area, and the detection of color can be performed with a single photo detector. As a result, advantageous effects can be obtained in that non-uniformity in the color detection results and mistakes in reading are reduced, and further, there is no waste of time, labor, etc., in the reading operation of the perforation diameter. The reading can also be carried out in a short time even for a pattern original for a printed substrate having many different kinds of drill diameters to be used for perforation.

What is claimed is:

1. An automatic pattern original reading apparatus comprising:
    a table for positioning and placing a hole diameter indication sheet having a colored indication formed at a position corresopnding to a perforation position of a pattern original for a printed substrate, said color indication indicating a hole diameter;
    optical means opposed to said hole diameter indication sheet on said table for optically reading said colored indication;
    position control means for moving said optical means and said table relatively in accordance with perforation position coordinate data prepared beforehand by reading the perforation position of said pattern original and for sequentially positioning to perforation position coordinates;
    color discriminating means for discriminating color information color by processing an output of said optical means; and
    memory means for storing an output of said color discriminating means in a corresponding relationship with said perforation position coordinate data;
    said optical means including:
    a light source for illuminating the surface of said hole diameter indication sheet,
    color filter means for selectively transmitting reflected light from said hole diameter indication sheet, and
    a single photo detector for detecting the transmitted light through said color filter means;
    said position control means performing position control by retrieving stored data form said memory means.

2. The apparatus according to claim 1 wherein said hole diameter indication sheet is formed by a transparent and colorless body and said colored indication for the hole diameter having the greatest number on the hole diameter indication sheet is selected to be transparent and colorless.

3. The apparatus according to claim 1 further comprising a plurality of hole diameter indication sheets, wherein said memory means stores color discrimination data from said color discriminating means and sheet information of each of said hole diameter indication sheets in corresponding relationships with the perforation position coordinate data.

4. The apparatus according to claim 1 wherein said position control means, based on the stored data stored in said memory means, skips the perforation position coordinates of the color discrimination data which has already been stored in said memory means.

* * * * *